(No Model.)
G. A. BIDWELL.
PIPE JOINT.
No. 460,424.      Patented Sept. 29, 1891.
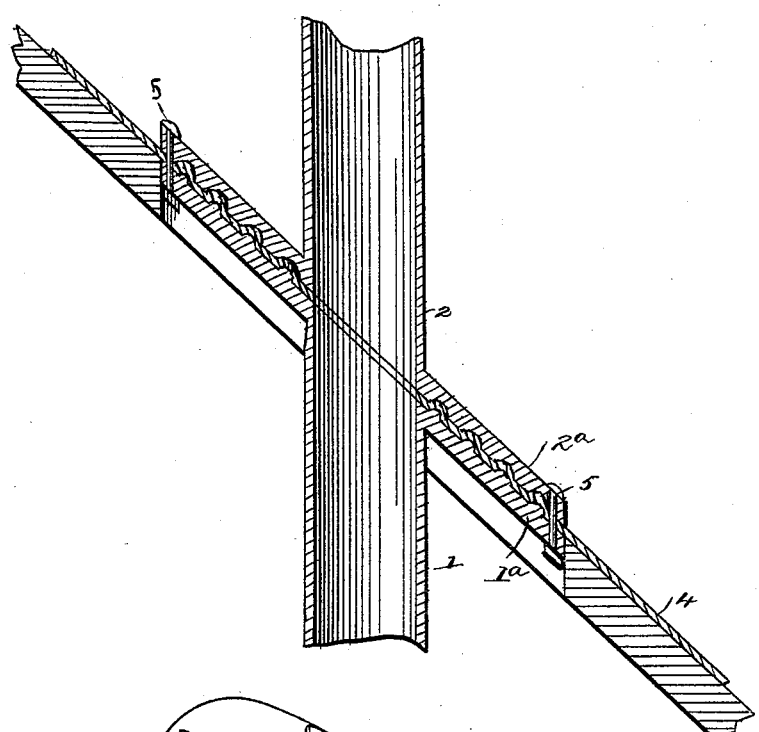
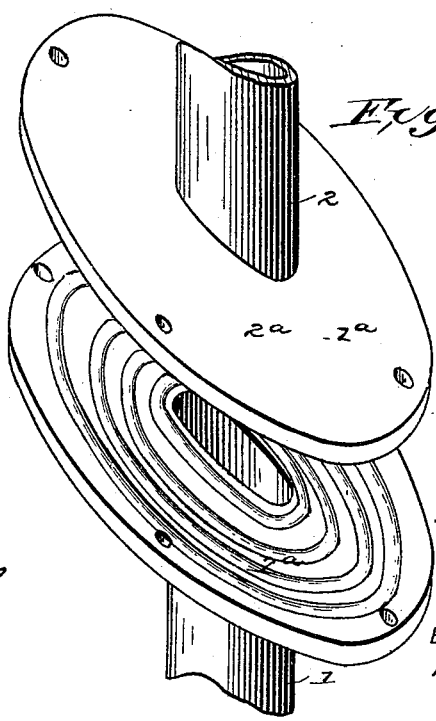
WITNESSES:
Geo. A. Bidwell
INVENTOR
BY
ATTORNEYS.

UNITED STATES PATENT OFFICE.

GEORGE A. BIDWELL, OF PITTSFIELD, MASSACHUSETTS.

PIPE-JOINT.

SPECIFICATION forming part of Letters Patent No. 460,424, dated September 29, 1891.

Application filed April 18, 1891. Serial No. 389,470. (No model.)

*To all whom it may concern:*

Be it known that I, GEORGE A. BIDWELL, a citizen of the United States, residing at Pittsfield, in the county of Berkshire and State of Massachusetts, have invented certain new and useful Improvements in Pipe-Joints; and I do hereby declare the following to be a full, clear, and exact description of the invention, such as will enable others skilled in the art to which it appertains to make and use the same.

My invention consists in a new and improved pipe-joint, which is especially designed to be used where a pipe passes through an inclined roof, but which can, of course, be employed in any point in the length of the pipe where a joint must be formed; and the invention will be hereinafter fully described and claimed.

Referring to the accompanying drawings, Figure 1 is a vertical sectional view illustrating my new and improved pipe-joint. Fig. 2 is a perspective view of the pipe-joint.

Referring to the several parts by their designating-numerals, 1 2 indicate two sections of a pipe, which in Fig. 2 of the drawings is shown passing through the inclined roof. The meeting ends of the two pipe-sections are formed with the inclined flanges 1ª 2ª, and I intend to form the end flanges of the pipe-sections at any desired angle or inclination, according to the pitch or slope of the roof through which the pipe is to pass. Between the inclined meeting flanges of the pipe ends (the pipe being usually formed of cast-iron) is placed a piece or washer 4 of soft metal, such as sheet-lead, for example. One of the flanges 1ª has the series of threaded bolts 5 preferably secured to it, and these bolts pass through suitable apertures in the soft-metal washer 4 and the flange 2ª of the other pipe-section.

It will be seen that by screwing the nuts 6 firmly down on the threaded upper ends of the bolts 5 the leaden or soft-metal washer 4 will be compressed between the hard-metal flanges of the two pipe-sections, and will thus form a pipe-joint through which it will be impossible for any leakage to occur. I prefer to form the meeting faces of one of the pipe-sections with a series of concentric grooves, while the other carries an equal number of ridges or ribs adapted to fit into said grooves. By this construction the sheet of soft metal will be compressed into the grooves and a more effective joint will result, as will be seen in Fig. 1.

The inclined flanges of the pipe-sections are bolted together on the upper side of the inclined roof, and the leaden washer 4 has its extended ends secured to the roof, as shown in Fig. 1, so that it will be impossible for the water running down the roof in times of rain and snow to leak through the opening formed through the roof for the passage of the pipe.

I am aware of the existence of Patent No. 301,512, wherein concentric grooves and ribs are formed in the meeting faces of the flanges, and I make no claim for such construction.

Having thus described my invention, what I claim, and desire to secure by Letters Patent, is—

In combination, the pipe-sections, each integrally formed with inclined thin circular flanges, said flanges having holes near their edges adapted to register for the reception of the retaining-bolts, the leaden washer 4, of a greater diameter than said flanges, adapted to be compressed between said flanges and reaching under the contiguous shingles, slats, or other roofing, and the retaining-bolts having the nuts on their threaded ends passing through said flanges and the leaden washer between the same, as set forth.

In testimony whereof I affix my signature in presence of two witnesses.

GEORGE A. BIDWELL.

Witnesses:
   THOMAS N. ENRIGHT,
   DANIEL MILLARD.